United States Patent [19]

Malone et al.

[11] Patent Number: 4,896,860
[45] Date of Patent: Jan. 30, 1990

[54] ELECTRICALLY OPERATED REFRIGERANT VALVE

[75] Inventors: Peter J. Malone, Elk Grove; Robert J. Torrence, Addison, both of Ill.

[73] Assignee: Eaton Corporation, Cleveland, Ohio

[21] Appl. No.: 348,368

[22] Filed: May 8, 1989

[51] Int. Cl.[4] .............................................. F16K 31/06
[52] U.S. Cl. ........................... 251/129.05; 251/129.15; 251/65
[58] Field of Search ................. 251/129.15, 65, 129.05

[56] References Cited

U.S. PATENT DOCUMENTS

| | | | |
|---|---|---|---|
| 3,588,039 | 6/1971 | Chelminski | 251/129.15 |
| 4,452,424 | 6/1984 | Kawata | 251/129.15 |
| 4,504,039 | 3/1985 | Kariya | 251/65 |
| 4,548,047 | 10/1985 | Hayashi et al. | 251/129.15 X |

Primary Examiner—Arnold Rosenthal
Attorney, Agent, or Firm—R. A. Johnston

[57] ABSTRACT

A solenoid operated refrigerant expansion valve, particularly for automotive air conditioning systems, having a center-post guided tubular armature which slides on the post to provide valving of cross-ports communicating with a hollow region in the post which communicates with the valve outlet. The tubular armature has a pair of sleeves disposed on the interior at opposite ends thereof which provide the sole sliding contact surfaces on the post for minimizing friction therebetween to reduce the tendency of the armature to seize on the post.

9 Claims, 1 Drawing Sheet

ELECTRICALLY OPERATED REFRIGERANT VALVE

CROSS REFERENCE TO RELATED APPLICATION:

This application is related to copending application Ser. No. 188,017 filed Apr. 29, 1988 entitled "MODULATED ELECTRICALLY OPERATED REFRIGERANT EXPANSION VALVE" in the name of Robert J. Torrence.

BACKGROUND OF THE INVENTION

The present invention relates to expansion valves for providing flow of liquid refrigerant at a reduced pressure to an evaporator in a refrigeration system having refrigerant circulated from a compressor through a condenser, expansion means and to an evaporator for vaporization therein and return to the compressor. The present invention particularly relates to electrically operated refrigerant expansion valves employed in automotive air conditioning systems where the compressor undergoes rapid and wide variations in speed as a result of changes in engine speed. Systems of this type are also exposed to rapid and wide variations in thermal load on the evaporator and a wide variation of ambient conditions experienced by the condenser.

Heretofore, in designing solenoid operated refrigerant expansion valves for automotive air conditioning systems, problems have been encountered with friction between the armature and the guide means for the armature; and, in some cases failures have been experienced with the armature sticking in a particular position due to friction causing the valve to be thereafter non-responsive to variations in the width of the electrical control signal pulse. Attempts to eliminate such armature sticking by increasing the clearances between the armature and the armature guide have proven impractical where the armature is guided internally and valving action is provided by sliding the internal surface of the armature over cross ports in the internal guide member. Increased clearance between the armature and the cross ports has resulted in undesirable increases in the residual flow of the valve when the armature is in the position for closing the ports; and, has also resulted in noise or buzzing of the armature where the control signal has a frequency on the order of 30-60 Hz.

It has therefore been desired to find a way or means of improving the guidance of the armature in a solenoid operated refrigerant expansion valve in a manner which will maintain the proper residual flow through the valving ports when the armature is in the closed position. It has also been desired to prevent sticking of the armature when moved to any of plural positions for opening the ports in response to a pulse width modulated (PWM) signal. It has been particularly desired to find such a valve construction suitable for use in automotive air conditioning applications wherein the control signal for the valve has a voltage signal level of 12 volts from the onboard vehicle power.

SUMMARY OF THE INVENTION

The present invention provides a solenoid operated refrigerant valve having an annular elongated armature which is center-guided by a post having a tightly controlled clearance between the post and the armature. Valving is accomplished by sliding movement of the armature over a pair of cross ports formed in the center guide post. The clearance between the post and the armature inner surface controls the residual flow to the cross ports when the armature is in the closed position covering the cross ports. Sliding contact between the inner surface of the armature and the guide post is maintained by a pair of spaced annular sleeves disposed at the ends of the armature and having the inner diameter thereof slightly less than the remaining portions of the armature to thereby provide contact with the post only on the surface of the sleeves.

The unique and novel armature construction of the present invention employs sleeve inserts at the ends of the annular armature to not only provide controlled clearance of the armature between inner surface thereof and the guide post but also to reduce the contact area of the surface of the armature with the post to thereby reduce any tendencies for frictional forces to cause the armature to stick and remain stationary in any position.

DETAILED DESCRIPTION

Figure 1:
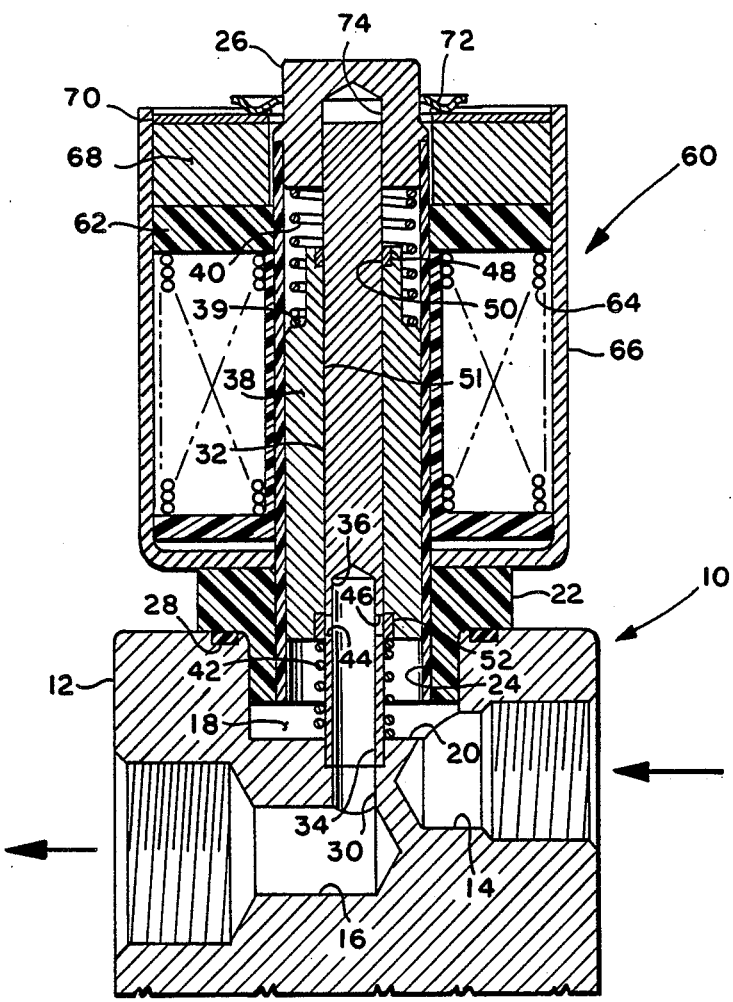
FIG. 1 is a cross-section of the solenoid and portions of the valve body of a refrigerant expansion valve employing the present invention.

Referring to FIG. 1, the valve assembly of the present invention is indicated generally at 10 and has a valve body 12 having an inlet 14 adapted for having a threaded fitting connected thereto for receiving high pressure liquid refrigerant from a condenser. An outlet 16 is threaded and adapted for receiving a fitting for connection to the inlet of an evaporator.

A valving chamber 18 is formed by a counterbore 20 provided in the body 12 which counterbore intersects inlet 14 for communication therewith and is threaded to receive a flange 22 which has attached thereto a tubular casing 24 having the upper end thereof closed by a plug 26. Flange 22 is sealed against the body by a suitable seal ring 28. In the presently preferred practice, the casing 24 is formed of nonmagnetic material as for example, stainless steel.

Body 12 has a central passage 30 which intersects and extends vertically upward from the outlet 16. A counterbore 34 has provided in the vertical passage 30 and has one end of a guide post 32 press fitted or sealed by weldment therein a hollow interior bore 36 is provided in the end of the post. The post 32 is thus sealed at its lower end into the counterbore 34 such that the vertical passage 30 communicates only with the interior bore 36 of the post.

The post 32 has the outer diameter thereof formed to carefully controlled tolerances to provide an accurately controlled clearance fit with a sliding surface provided on the inner periphery of an annular elongated armature 38 which is received on the post 32 in close-clearance sliding engagement. Armature 38 is biased in a downward direction in FIG. 1 by a spring 40 having one section end registered in a shoulder 39 provided in the upper end of the armature with the other reaction end of the spring registered against the undersurface of plug 26. It will be understood that armature 38 is formed of ferromagnetic or other suitable material of high magnetic permeability.

The downward travel of the armature 38 is limited by a second coil spring 42 received over the lower end of post 32. Spring 42 has its free length controlled and chosen such that the armature 38 is normally at rest against the upper end of the spring but is pulled away from the end of spring 42 upon upward movement of the armature. The spring rate of the spring 42 is substantially greater than that of the rate of spring 40; and, spring 42 is intended only as a resilient limit-stop for armature 38 in the closed position.

A pair of oppositely disposed cross ports 44, 46 are formed in the wall of the bore 36 in the lower end of the post 32 and, the cross ports provide communication between the bore 36 and the valving chamber 18 such that when the ports are at least partially open, fluid can flow from inlet 14 and chamber 18 through the ports 44, 46 and passage 30 to outlet 16.

Figures 2, 3:
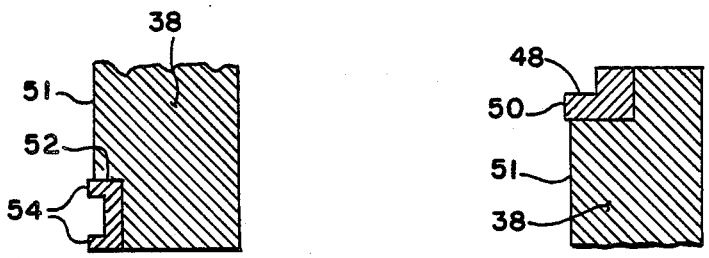
FIG. 2 is an enlarged detail of the insert sleeve in the upper end of the armature of the valve of FIG. 1.
FIG. 3 is an enlarged section view of a sleeve insert in the lower end of the armature of the valve of FIG. 1.

Referring to FIGS. 1 and 2, the inner periphery of the armature 38 has provided at its upper end an insert sleeve 48 which, as shown in FIG. 2, has in the preferred practice, a generally right angle or L-shaped configuration. The inner diameter 50 of the insert 48 is slightly less than the inner diameter 51 of the central region of the armature by amount sufficient to ensure that the upper end of the armature 32 contacts the post only along the inner surface 50 of the insert sleeve.

Referring to FIGS. 1 and 3, the lower end of the armature 38 has an insert sleeve 52 provided at the inner periphery thereof; and, the sleeve 52 has a generally C-shaped configuration as shown in FIG. 3 with the edges thereof extending radially inwardly a slight amount from the inner surface 51 of the armature such that only the radially inner surfaces 54 contact the surface of the post 32. It will thus be understood that the armature slides on the post 32 with only the inner surfaces 50, 54 of sleeves 48, 52 making sliding contact with the outer surface of the post 32. In the presently preferred practice of the invention, the sleeves 48,52 are formed of suitable bearing material as for example, brass or polytetrafluroethylene material.

The lower sleeve 52 has an axial width, or vertical height in FIGS. 1 and 3, sufficient to span the diameter of the ports 44, 46 such that with the armature at rest under the urging of spring 40, the sleeve 52 completely covers ports 44,46 to thereby close the valve when the lower end of the armature makes contact with the upper end of spring 42 at its free length.

Referring to FIG. 1, the solenoid indicated generally at 60 has a bobbin 62 with a coiled conductor 64 of magnet wire wound therearound in many turns, typically several thousand, to provide sufficient magnetomotive force at low voltage, typically 12 volts, overcome the bias of spring 40 to move armature 38 upwardly in response to energization of the coil 64. The coil is surrounded by a pole frame 66 formed of material of high magnetic permeability. A permanent magnet 68 is located within pole frame 66 adjacent to bobbin 62. The permanent magnet 68 enhances electromagnet force characteristics. A temperature responsive shunt washer 70 is adjacent to permanent magnet 68 to provide for a decrease in shunting at higher temperatures to compensate for electromagnetic force reduction from coiled conductor 64 at high temperatures due to decreased electrical conductivity. The coil and bobbin, magnets, and washer are inserted into the frame 66; and, the coil assembly is received over the casing 24 and retained thereon by a suitable clip 72.

In the presently preferred practice, the post 32 has its upper end received in a counterbore 74 provided in the undersurface of the plug 26. The upper end of the post 32 interfits the bore 74 in closely fitting arrangement to thereby prevent cantilever deflection of the post.

The present invention thus provides a unique construction for a solenoid operated refrigerant expansion valve having an elongated annular armature center-guided by a post having cross ports therein for providing a valving action between the outer surface of the post and the inner periphery of the armature which slides thereover in closely fitting arrangement. The inner periphery of the armature has provided at the ends thereof sleeve inserts which provide the sole sliding contact surface for the armature with the post and thereby minimize frictional forces and thus serves to reduce the tendency of the armature to seize or stick.

Although the invention has been described hereinabove with respect to the illustrated embodiments and in the presently preferred practice, it will be understood that the invention is capable of modification and variation and is limited only by the following claims.

I claim:

1. An electrically operated refrigerant valve assembly comprising:
    (a) a valve body means defining an inlet adapted for connection to a pressurized source of liquid refrigerant, an outlet adapted for connection to an evaporator and a valving chamber including a passage connecting said inlet and outlet;
    (b) casing means having a generally tubular configuration closed at one end with the other end attached to said body means and sealed thereon for closing said valving chamber;
    (c) guide post means having an end portion thereof attached to said body and defining a hollow thereon communicating with said passage and having at least one valving port for communicating said hollow with the exterior thereof;
    (d) armature means having ferromagnetic properties disposed for sliding movement thereon, said armature means having a pair of longitudinally spaced guide means thereon, said guide means providing the sole sliding contact surfaces between said post means and said armature means, with one of said guide means configured to close said at least one port when slidably disposed thereover; and,
    (e) electromagnetic coil means disposed over said casing means and attached to said body means, said coil means operative upon flow of electrical current therethrough to provide a magnetomotive force for moving said armature means from a position closing said at least one port to any of a plurality of positions at least partially opening said port for permitting controlled flow from said inlet to said outlet.

2. The valve assembly defined in claim 1 wherein said guide post means registers against the closed end of said casing means.

3. The valve assembly defined in claim 1 wherein said port means at least one port comprises a pair of oppositely disposed cross ports.

4. The valve assembly defined in claim 1 further comprising means biasing said armature means in a direction for closing said at least one port.

5. The valve assembly defined in claim 1, wherein one of said guides has a generally L-shaped configuration in transverse section.

6. The valve assembly defined in claim 1, wherein said one of said guides disposed to close said port has a generally U-shaped configuration in cross section.

7. The valve assembly defined in claim 1, wherein one of said guide means comprises an annular member having a radial undercut formed in the surface contacting said port means.

8. The valve assembly defined in claim 1, wherein said armature means has an annular configuration with one of said pair of guide means disposed at opposite ends thereof.

9. The valve assembly defined in claim 1, wherein said armature means and said guide means have an annular configuration.

* * * * *